Sept. 25, 1962  D. H. HESTER  3,055,556
LIQUID DISPENSER
Filed Oct. 3, 1955
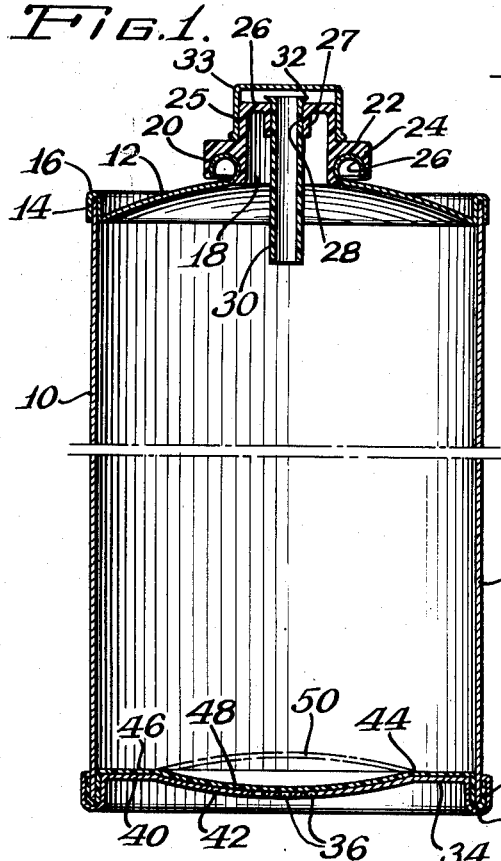
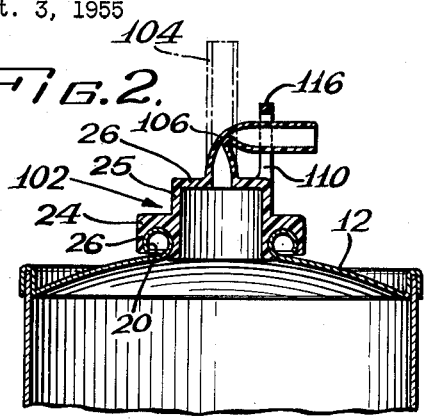
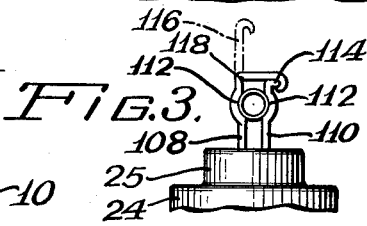
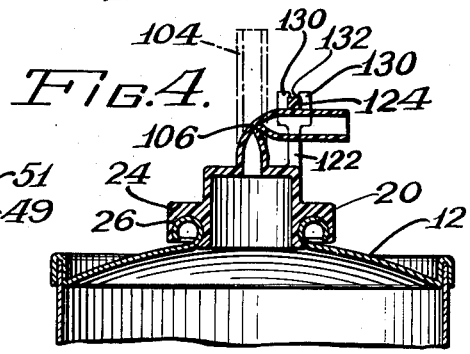
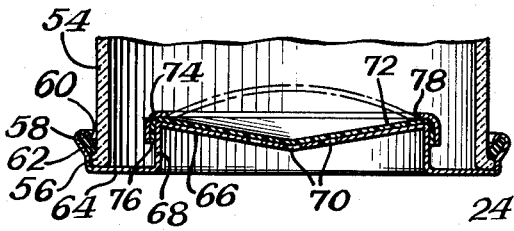
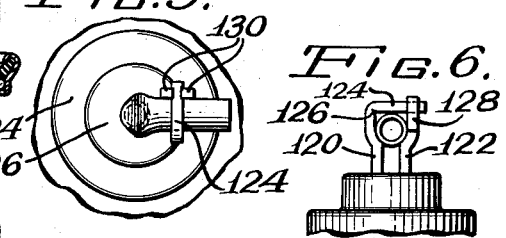
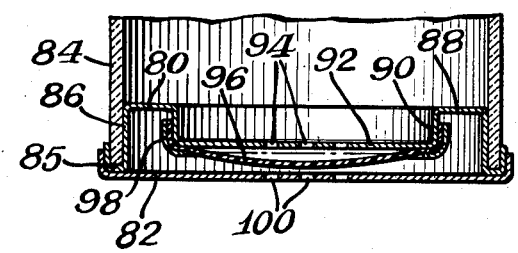
INVENTOR.
Dwight H. Hester
BY
Warren P. Horton
Atty.

United States Patent Office 3,055,556
Patented Sept. 25, 1962

3,055,556
LIQUID DISPENSER
Dwight H. Hester, 315 Lorel Ave., Chicago, Ill.
Filed Oct. 3, 1955, Ser. No. 538,092
13 Claims. (Cl. 222—212)

My invention relates to a dispensing container for liquids and more specifically to a container for pouring out predetermined measured quantities of liquid.

There are many circumstances in which it is desirable to pour out measured quantities of liquids. Liquor dispensers are well known which pour out measures of whiskey, etc. and which may be transferred from one bottle to another. My invention, however, is directed to dispensing apparatus which is to be associated with containers other than bottles and which will be incorporated in the container at the time of manufacture. My invention is largely illustrated and discussed in relation to metal containers, "tin cans," but its applicability to plastic or even glass containers will be evident.

One instance which occurs to me of a liquid requiring measurement which is commonly packaged in a metal container is the liquid synthetic detergents. These detergents are extremely powerful and the housewife chronically underestimates their strength. They use too much in a pan of dishes, which is not only expensive but is also likely to be injurious to the hands. The value of a dispensing device in such a case is evident. Other instances where packaging of this type would be useful are too numerous to mention, but in general, wherever a canned liquid is to be used in measured quantities of from approximately one-quarter of an ounce to three or four ounces, my invention will find great utility.

One object of my invention therefore may be considered to be to provide a container with a dispensing device to permit the delivering therefrom of a predetermined measured quantity of the liquid.

Another object of my invention is to incorporate the components of a dispensing device integrally into a metallic can or similar container for dispensing predetermined measured quantities of liquid therefrom.

Still another object of my invention is to provide for the inclusion of dispensing apparatus of the type described into a metallic can or equivalent container which adds only minimal expense and complication to the manufacture thereof.

Yet another object of my invention is to provide dispensing mechanism of the type described, which is suitable for use in glass packaging.

It is advantageous in handling packages of liquid which demand measurement to be able to manipulate them with one hand. To apply a conventional cap, however, requires the use of two hands. My invention has therefore as a still further object the provision of stopper mechanism which can be operated by just the one hand holding the container while the container is held in that hand.

Still another object of my invention is to provide a container cap which includes a flexible pouring tube having a diameter too small to permit the counterflow of air into the container as liquid is pouring out of the container.

Yet another object of my invention is to provide a cap incorporating such a tube wherein the tube may be folded over to pinch off the flow of liquid therethrough so as to constitute a stopper for the container and which includes latch or locking means for holding the tube in that position.

Other objects and advantages of my invention will be apparent from the following description and drawings of which:

FIG. 1 is a central vertical section through a container embodying my invention;

FIG. 2 is a similar section through the top of the container showing an alternative form of container cap;

FIG. 3 is an elevation of the cap illustrated in FIG. 2 and may be regarded as looking at the cap from the right side of FIG. 2;

FIG. 4 is a view similar to FIG. 2 and illustrates an alternative tube latch to that shown in FIGS. 2 and 3;

FIG. 5 is a top plan view of the latch illustrated in FIG. 4;

FIG. 6 is an elevation of the cap of FIG. 4 viewed from the right side thereof;

FIG. 7 is a central vertical section through the bottom of a container showing an alternative form of my measuring device; and FIG. 8 is a view similar to FIG. 7 showing, however, still another form of my measuring device.

The container of FIG. 1 embodying my invention includes the usual cylindrical side walls 10. An annular domed lid 12 is crimped in conventional fashion over the top edge 14 of the sides 10 as at 16 to make a liquid-tight seal therein. The inside edges 20 of the lid defining the aperture 18 are curled outwardly and back on a curve of relatively large radius through about 270°.

A cap 22 is provided to close the aperture 18. It should consist of a plastic material of limited flexibility of the nature of polyethylene or relatively hard rubber. It comprises an annulus 24 of a relatively large rectangular section having a groove 26 in the bottom thereof complementary to the curvature of the curled edge 20 and having a curvature of somewhat more than 180°. The cap 22 is attached to the curled edge 20 simply by pressing the cap down on the edge 20. The limited flexibility of the material of which the cap is made permits the lower edges of the groove to spread sufficiently to slide over the curled edges 20 and snap in place downwardly of the maximum diameter of curl to provide a firm snap fit between the cap and the edges 20 which is liquid-tight.

The material of which the cap is made extends upwardly 25 inwardly 26 and then downwardly 27 in thinner section than the annulus 24 to leave a hole 28 centrally thereof. A tubular metallic pouring spout 30 is slidably contained within the hole 28. The pouring spout 30 should have a flared outer end 32 for the several purposes of preventing the pouring spout from being forced back into the can or container, providing a finger grip for seizing the pouring spout and drawing it outwardly and also providing an efficient pouring lip. A cover 33 fitting snugly the outside surface of the portion 25 of the cap is provided to cover the pouring spout 30. The pouring spout may be collapsed into the can as illustrated to receive the cover 33 or extended outwardly from the container for more convenient pouring. The pouring spout should be sufficiently small in diameter so that when the container is inverted, bubbles of air cannot by-pass the liquid within the tube 30.

The bottom of the container illustrated in FIG. 1 is a round member 34 having a plurality of central perforations 36 therein. The outer part 40 of the bottom of the illustrated container is plane whereas the inner part of the bottom 42 is convex. The division of the bottom between the outer plane portion and the inner convex portion is provided in part for a possible manufacturing technique, but also serves to limit the measure poured out.

Other manufacturing techniques readily conceivable will permit the use of differently shaped bottoms such as wholly convex bottoms or plane bottoms. The manufacturing technique is no part of my invention and insofar as it is described, it is to be regarded as being only illustrative.

The final component of my invention is a flexible but non-stretchable diaphragm 44. This diaphragm may be formed of rubber, a plastic film as thin polyethylene, impregnated cloth, etc. The shape of the film should conform to the bottom 34 of the can so as to lie against the surface thereof. It should have an outer plane 46 and an inner convex portion or bulge 48. By virtue of the flexibility of the diaphragm 44, the convex portion 48 is capable of reversal to a concavity as illustrated by the dotted lines 50.

As it is well known, the bottoms of metal containers, such as tin cans, are supplied in circular blanks which are attached to the can sides by crimping and sometimes soldering. The particular method of incorporating the diaphragm into the can upon which the illustrated bottom configuration of the can is based is to form the blanks for the can bottoms with the convexity 42 formed therein. Thereafter, the diaphragm sheet, which may be as large as or somewhat larger than the can bottom, is applied to the bottom blanks and tacked to the plane portion 40 by means of heat. In advance of this tacking a convex die, shaped to the surface 42, descends to hold the film against the convex surface.

The bottom blanks, then, having the plastic diaphragms fastened thereto, are secured in ordinary fashion to the cylindrical container walls. Any edges of the diaphragm which may protrude outside the crimped edge of the bottom is readily torn off.

The operation of my invention will be apparent from the foregoing description. When it is desired to pour out a measure of liquid contained in a can, the pouring spout 28 is extended outward and the can turned upside down. Liquid will thereafter pour out the spout, the diaphragm 44 collapsing from its outwardly bulging position as at 48 to displace the outpouring liquid, to its inwardly bulging position 50 at which time the failure of further displacement shuts off the flow. As was stated before, the pouring spout 28 is small enough in diameter to prevent the entry of air through the spout while the can is in its inverted position. Upon reversal of the can again to its upright position, the weight of the liquid carries the diaphragm 44 back to its convex position, resting against the bottom 34 of the can, and a corresponding quantity of air enters through the pouring spout.

The volume of the measure dispensed is determined by the lenticular space 52 defined by the diaphragm in its convex position on one side and in its concave position on the other side.

Mention was also made above of the fact that the diaphragm should be non-stretching and yet rubber was suggested as a possible material for the diaphragm. While a rubber is stretchable, the only force applied to the diaphragm would be the weight of the liquid in the container when the container is inverted for pouring, the measured quantity has been poured, and the diaphragm, in effect, is "hanging" on the diaphragm. This force is slight, and I contemplate the use of a diaphragm of such thickness that under such force, no stretching will occur. As the term "non-stretchable" is used in this application, it will be understood to mean that there is no stretch under the circumstances of the particular forces involved.

In FIG. 7 is illustrated an alternative form which my measuring diaphragm may take or, more exactly, an alternative form for incorporating the diaphragm into a container. In this illustration, cylindrical container sides of glass 54 having a small bead 56 on the lower edge thereof are shown. The method of attachment of the diaphragm-containing bottom is that commonly employed to secure the tops of jelly jars, pickle jars or the like. The cover or bottom includes a substantially cylindrical rim 58 overlying the bead 56 which has a recurved edge 60 embracing an annular rubber gasket 62, which makes an effective seal against the outside of the glass. This structure is commonplace and needs no further amplification.

The plane portion 64 of this common type of closure is modified toward the center thereof and formed to provide a convexity 66 (or a broad conical taper as illustrated) offset inwardly by a cylindrical wall 68. The convexity is perforated as at 70 like the can bottom 34 of the container of FIG. 1.

In this modification a diaphragm 72 larger in diameter than the cylindrical wall 68 and having the necessary "belly" or bulge therein is placed on the convex bottom portion 66 and a clamping ring 74 grasps the edges 76 of the diaphragm firmly against the outside of the cylindrical wall 68. The inside edge 78 of the clamping ring 74 extends no farther radially than over the end of the cylindrical wall 68 so as to permit free movement of the diaphragm 72. The operation of this modification will be precisely the same as that illustrated in FIG. 1.

It will be understood, of course, that although this modification has been shown in conjunction with a glass-walled container, it is entirely applicable to metal-walled containers and plastic containers.

A further advantage of this particular modification lies in the fact that it is well suited for the inclusion of my measuring mechanism in the substantially rectangular one-quart or one gallon cans such as weed killers, insecticides, and other spray concentrates are often packaged in.

FIG. 8 illustrates still another form which may be employed in effectuating my invention. In this instance, the bottom closure consists of two metallic members, a diaphragm support 80 and a bottom cap 82. Both of these members are crimped to the side wall 84 of the container with the bottom cap 82 underlying the diaphragm support 80. From the crimped edge 85 the diaphragm support follows the inside wall of the container as at 86 for a distance to recess the diaphragm within the confines of the side walls 84 of the container. Thereafter, it extends radially inward as at 88 and then outwardly a short distance as at 90 and thence inwardly across the bottom of the container as at 92. The walls 90 and 92 define a cylindrically-walled projection from a recessed bottom. The surface 92 has a plurality of perforations 94 therein.

The diaphragm 96 is secured on the outside of the projection as in the modification illustrated in FIG. 7, which however places the diaphragm on the outside of the wall to which it is secured rather than the inside as illustrated in FIG. 7. The means of attaching the diaphragm to the projection is the same as shown in FIG. 7, i.e., a ring 98 pressed over the walls 90 to seize the edges of the diaphragm between the wall 90 and the ring 98.

The bottom cover may extend flat across the bottom of the container, and it too should have perforations 100 therein.

In this modification, the non-stretching diaphragm having the bulge or belly in it may be used as in the previous modifications. In the erect position the diaphragm itself sustains the weight of the liquid and in inverted position it moves against the surface 92, which may be flat as illustrated or concave if a greater measure is desired.

This modification permits the use, however, of a stretching diaphragm or a diaphragm in which it is specifically intended that the material thereof deform under the weight of the liquid. In such case the diaphragm would be forced down to be supported by the bottom cover 82. The measure dispensed would be determined by the space defined on one hand by the diaphragm in its position resting against the cover 82 and its position on the other hand resting against the surface 92 which the diaphragm will take as the last of the liquid measure is poured from the container. The difference between the use of stretching and non-stretching diaphragm lies in the fact that the non-stretching diaphragm contains an inherent limit on its movement by virtue of the nature of the material whereas, in the case of the modification illustrated in FIG. 8, a supplemental limit is imposed by the cover 82. Thus, when the can of FIG. 7 is inverted and an elastic diaphragm is used therein, the diaphragm could swell, assuming perfect elasticity to cover the whole interior of the container and permit the pouring out of all the contents thereof. In the case of FIG. 8 without the bottom cover 82 the entire contents would drain from the container into the diaphragm which would hang like a bag from the ring 98 when the container is in erect or non-pouring position.

The point to this discussion is that I have described the diaphragm above as being "non-elastic" or "non-stretching." It is possible as indicated here to use a stretching diaphragm, but the diaphragm must be contained between two limits in order to obtain precise liquid measurements therefrom. A non-elastic diaphragm could conceivably provide both of these limits itself. Thus, if a sufficiently firm connection could be made between a bellied diaphragm and the container walls 10 of FIG. 1 and the diaphragm were sturdy enough to support the weight of the liquid, no metallic bottom 40 would be required at all. For the elastic diaphragm, though, as considered in conjunction with the structure shown in FIG. 8, both the surfaces 92 and 82 are absolute requisites to obtain the accurate measure.

It was pointed out before that it is highly desirable in handling containers of the type which can advantageously use my measuring mechanism to dispense with the conventional separate closure for such containers and provide a closure which can be opened or closed by simply a flick of the finger of the hand holding the container. My dispensing mechanism makes such provision remarkably easy. An essential element of my dispensing mechanism is a pouring tube of a diameter small enough so that there can be no counterflow of air therethrough while pouring liquid out. It is a direct corollary of this necessary component of my dispensing mechanism to make such a tube of flexible material which may be buckled over so as to pinch off and so constitute a stopper for the container as well as a pouring tube. Means of course must be provided for holding the tube in its bent and buckled position, and two forms of such stoppers are illustrated in FIGS. 2 through 6.

The bottom structure of the closure 102 of FIGS. 2 and 3 is substantially the same as that shown in FIG. 1 and includes the heavy annulus 24 with the deep round groove 26 therein which snaps over the recurved inner edge 20 of the container top 12. In both these forms the material of which the cap is made continues upward 25 in thinner section and inward 26. Extending upwardly from the portion 26 is the pouring tube 104 having an interior diameter to meet the non-counterflow requirement of the dispenser. It is considered that both these closures be formed in one piece of, desirably, polyethylene. The tubes 104 should have score lines on one side thereof at the position indicated by 106 to insure that the tube buckle sharply at a predetermined point as it is bent and close completely the tube passage.

The two forms illustrated in FIGS. 2 through 6 differ in the latching mechanism provided for holding the tube in the buckled position. In the form illustrated in FIGS. 2 and 3, a pair of arms 108 and 110 extend upward from the stopper in line with the portion 25 and also in line with the plane of buckling of the tube 104. The arms 108 and 110 are spaced apart to a slightly less degree than the diameter of the tube 104 and have notches 112 in their facing surfaces opposite each other to receive the tube. The arm 110 has a bead 114 at its end and the arm 108 has a hooked latching member 116 which constitutes an upward extension of the arm 108. The latching member 116 is defined by a score line 118 to locate the point of bending.

In the modification illustrated in FIGS. 4, 5, and 6, the structure is substantially the same except for the latching mechanism. In this instance, a pair of arms 120 and 122 extend upwardly from the edge of the cap portion 26. These arms likewise are spaced so that the tube 104 fits relatively tightly therebetween. In this instance also the arm 120 includes a normally upstanding latching member 124 which is defined, separate from the arm 120, by score line 126. The end of the latching member 124 is without the hook of the first described modification. The arm 122 terminates upwardly in a widened bifurcated end 128. The space between the bifurcations is such as to receive the end of the latching member 124 snugly. The ends of the bifurcations 130 may have inwardly facing small beads 132 so as to seize the latching member affirmatively.

It will be understood that both of these closures may be formed of one-piece polyethylene moldings.

The operation of these closure members is self-evident. The tubes 104 occupy normally a vertical position for pouring. When it is desired to shut off flow, the tube is pushed over by finger to lodge between the arms 108, 110 in the first modification or arms 120, 122 in the second modification. The arms seize the tube to hold it in its bent-over position sufficiently firmly to permit the finger to be moved to operate the latching member. The bending of the tube collapses the tube on the score line 106 so as to close the container. The resilience of the polyethylene permits the latching member 116 of FIG. 3 to bend centrally as it is pushed down so as to engage the hook thereof over the bead 114. In the case of the modification of FIGS. 4 through 6, resilience of the polyethylene permits the arms 130 to spread to receive the latching member 132.

In the following claims, the word "capillary" will be understood to refer to that tube characteristic of being too small to permit the counterflow of air into the container as liquid is pouring out of the container through the tube. The inside diameter of the tube may vary considerably depending on the liquid to be packaged. Counterflow of air is a manifestation of the surface tension and possibly the viscosity of the liquid, and these properties vary widely between different liquids.

As was mentioned above, the quantity of liquid dispensed is determined by the volume enclosed between the two positions of the diaphragm. Should the manufacturer choose a full sized and evenly curved diaphragm the liquid poured may be limited to less than the volume defined by the full movement of the diaphragm, by using a bottom 34 having less curvature than the diaphragm such as a flat bottom or even a bottom having a slight inward curvature.

From the foregoing description, it will be understood that my invention may take many forms and appear in many embodiments. I therefore prefer that my invention be regarded as being limited only as set forth in the following claims.

I claim:

1. A dispensing liquid container comprising a container body, a pouring spout having an internal diameter proportioned to prevent flow of air into the container counter to the flow of the liquid to be contained in the container outwardly thereof during outward flow of such liquid and a flexible, non-stretching diaphragm secured to said body to constitute a portion of a wall of said body above said pouring spout when said container is in pouring position, said diaphragm being exposed to the atmosphere exterior of said body and movable between a position of greater interior capacity of said body and a position of less interior capacity of said body in response to positive and negative pressure of the contents of said container respectively, the capacity difference between said positions defining the measure of liquid poured.

2. A liquid container for dispensing measured quantities of liquid therefrom having side walls, a perforated bottom, a top, a pouring spout having an internal diameter proportioned to prevent flow of air into the container counter to the flow of the liquid to be contained in the container outwardly thereof during outward flow of such liquid in said top, and a limp, flexible non-stretching diaphragm having a central bulge therein overlying the perforations of said bottom and secured at its edges to said bottom laterally of said perforations to contain the liquid in said container.

3. A liquid container for dispensing pre-determined measured quantities of liquid having side walls, a bottom, a top, a pouring spout having an internal diameter proportioned to prevent flow of air into the container counter to the flow of the liquid to be contained in the container outwardly thereof during outward flow of such liquid in said top and a flexible diaphragm secured at its edges adjacent said bottom and movable between specific limits when said container is upright and when said container is in pouring position in response to the positive and negative pressure of the contents of said container respectively to provide a pre-determined change of volume in said container as between said positions, the exterior of said diaphragm being exposed to atmospheric pressure.

4. A liquid container for dispensing predetermined measured quantities of liquid having side walls, a top, a pouring spout having an internal diameter proportioned to prevent flow of air into the container counter to the flow of the liquid to be contained in the container outwardly thereof during outward flow of such liquid in said top, and bottom structure including a perforated bottom wall, a limp, flexible diaphragm secured at its edges adjacent said wall to be supported by said bottom when said container is upright, said bottom structure including means for placing a definite limit to the movement of said diaphragm away from said bottom wall when said container is in pouring position.

5. A metallic liquid container for dispensing predetermined measured quantities of liquid having side walls, a top, a pouring spout having an internal diameter proportioned to prevent flow of air into the container counter to the flow of the liquid to be contained in the container outwardly thereof during outward flow of such liquid in said top, a bottom crimped to said side walls, said bottom having a perforated convex portion, and a limp, flexible, non-stretching diaphragm having its periphery contained in said crimp and having a bulge therein to permit said diaphragm to lie against said bottom.

6. A liquid container for dispensing predetermined measured quantities of liquid having side walls, a top, a pouring spout having an internal diameter proportioned to prevent flow of air into the container counter to the flow of the liquid to be contained in the container outwardly thereof during outward flow of such liquid and a bottom secured to said side walls, said bottom being formed to provide a cylindrically walled projection having a perforated end, a clamping ring fitting closely the walls of said projection and a limp, flexible, non-stretching diaphragm clamped peripherally between said ring and said wall of said projection adjacent the end of said projection, said diaphragm being movable against and away from said end.

7. A liquid container for dispensing predetermined measured quantities of liquid having side walls, a top, a pouring spout having an internal diameter proportioned to prevent flow of air into the container counter to the flow of the liquid to be contained in the container outwardly thereof during outward flow of such liquid and a bottom, said bottom being formed to provide an internally extending projection having a generally concave perforated end, said bottom including also a clamping ring fitting closely over the cylindrical wall of said projection and a limp, flexible diaphragm having a central bulge therein clamped peripherally to said projection on the interior of said container between said ring and said cylindrical wall of said container.

8. In a liquid container for dispensing predetermined quantities of liquid, said container having a pouring spout having an internal diameter proportioned to prevent flow of air into the container counter to the flow of the liquid to be contained in the container outwardly thereof during outward flow of such liquid, a centrally bulged, limp, flexible, non-stretching diaphragm, means securing the periphery of said diaphragm to an interior wall of said container, the wall of said container being perforated behind said diaphragm, said diaphragm being mounted to be above the level of said pouring spout when said container is in pouring position.

9. A liquid container for dispensing predetermined measured quantities of liquid having side walls, a top, a pouring spout having an internal diameter proportioned to prevent flow of air into the container counter to the flow of the liquid to be contained in the container outwardly thereof during outward flow of such liquid in said top, a perforated bottom, a limp, flexible diaphragm secured peripherally to said bottom and exteriorly thereof, and a movement limiting member on the other side of said diaphragm to fix a definite limit to the movement of said diaphragm.

10. In a liquid container for dispensing predetermined measured quantities of liquid, said container having a pouring spout having an internal diameter proportioned to prevent flow of air into the container counter to the flow of the liquid to be contained in the container outwardly thereof during outward flow of such liquid, a limp, flexible diaphragm secured peripherally on the interior surface of a wall of said container at a point above the pouring spout when said container is in pouring position, and an air penetrable member interior of said diaphragm mounted in said container to place a definite limit to the inward movement of said diaphragm upon pouring liquid from said container.

11. A liquid container for dispensing predetermined measured quantities of liquid comprising a container body, a flexible pouring spout having an internal diameter proportioned to prevent flow of air into the container counter to the flow of the liquid to be contained in the container outwardly thereof during outward flow of such liquid having walls of a thickness to buckle closed when said spout is bent through approximately a right angle, quickly releasable latching means associated with said container body to maintain said pouring spout in said bent position, a bottom, a limp, flexible, bulged diaphragm secured peripherally interior of and against said bottom, said bottom being perforated under the central portion of said diaphragm.

12. A closure for a liquid container comprising a cap having a rim attachable to said container, a round flexible tube extending outwardly from the top of said cap and open through said cap, said tube having the characteristics of a polyethylene tube including that of buckling closed upon bending the tube through substantially a right angle and of restoring itself to open tubular condition upon release from said bending, said tube having a transverse score line thereon intermediate its ends to determine the line of buckling, and said cap having a pair of upstanding arms thereon spaced away from said tube and from each other to intercept the free end of said tube therebetween upon buckling the tube on said score line, and means attached to one of said arms to detain releasably the free end of said tube between said arms.

13. A liquid container for repeatedly and uniformly dispensing predetermined measured unit quantities of liquid by turning said container from a non-dispensing position to a dispensing position, said container having side walls, a bottom, a top and a spout on said top having an internal diameter proportioned to prevent flow of air into the container counter to the flow of the liquid to be contained in the container outwardly thereof during outward flow of such liquid, an opening to atmospheric pressure in said container located at a point above said spout when said container is in dispensing position, a flexible non-stretching diaphragm element having its periphery secured to and within said container lying over said opening, said diaphragm being externally exposed to atmospheric pressure through said opening, said diaphragm having a pocket of predetermined volumetric capacity framed by its outer edges secured to and within said container lying flatly against the interior surface of said container when opposed by positive pressure of the contents of said container, said pocket bulging to its predetermined volumetric capacity convexly within said container in response to negative pressure of the contents of said container and positive atmospheric pressure from the exterior of said container.

References Cited in the file of this patent

UNITED STATES PATENTS

| | | |
|---|---|---|
| 64,014 | Holt | Apr. 23, 1867 |
| 164,589 | Perkins | June 15, 1875 |
| 179,710 | Marlatt et al. | July 11, 1876 |
| 278,179 | Pond | May 22, 1883 |
| 2,116,077 | Mauguy et al. | May 3, 1938 |
| 2,685,385 | Kuss | Aug. 3, 1954 |